(12) United States Patent
Taherzadeh Boroujeni et al.

(10) Patent No.: US 12,302,339 B2
(45) Date of Patent: May 13, 2025

(54) PDCCH REPETITION CONFIGURATION BASED ON L1 REPORT

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/452,984

(22) Filed: Oct. 29, 2021

(65) Prior Publication Data

US 2023/0135507 A1 May 4, 2023

(51) Int. Cl.
*H04W 72/23* (2023.01)
*H04B 7/06* (2006.01)
*H04L 1/1607* (2023.01)

(52) U.S. Cl.
CPC .......... *H04W 72/23* (2023.01); *H04B 7/0626* (2013.01); *H04L 1/1607* (2013.01)

(58) Field of Classification Search
None
See application file for complete search history.

(56) References Cited

U.S. PATENT DOCUMENTS

| | | | |
|---|---|---|---|
| 6,782,503 B1 * | 8/2004 | Dawson | H04L 43/50 714/739 |
| 7,418,492 B1 * | 8/2008 | Cohen | H04L 43/50 709/224 |
| 7,808,902 B1 * | 10/2010 | Pham | H04L 43/50 370/231 |
| 8,004,994 B1 * | 8/2011 | Darisi | H04L 1/18 370/241 |
| 10,728,784 B2 * | 7/2020 | Yi | H04B 17/336 |

(Continued)

FOREIGN PATENT DOCUMENTS

| | | |
|---|---|---|
| EP | 3796582 A1 | 3/2021 |
| GB | 2522482 A | 7/2015 |

(Continued)

OTHER PUBLICATIONS

International Search Report and Written Opinion—PCT/US2022/045550—ISA/EPO—Dec. 23, 2022 (12 pages).

*Primary Examiner* — Christopher T Wyllie
(74) *Attorney, Agent, or Firm* — Procopio, Cory, Hargreaves & Savitch LLP

(57) ABSTRACT

A user equipment (UE) may transmit, to a base station, at least one of a physical layer (L1) report of the current beam. The base station may receive the at least one of the L1 report or a CSI feedback of the current beam from the UE, and transmit at least one physical downlink control channel (PDCCH) repetition based on a first repetition option associated with the L1 report received from the UE. The UE may receive, from the base station, the PDCCH repetition based on the first repetition option associated with the L1 report received from the UE. The base station and the UE may communicate physical downlink shared channel (PDSCH) or physical uplink shared channel (PUSCH) scheduled by the at least one PDCCH repetition based on the first repetition option associated with the L1 report or the CSI feedback.

30 Claims, 11 Drawing Sheets

(56) References Cited

U.S. PATENT DOCUMENTS

| | | | | |
|---|---|---|---|---|
| 12,176,983 | B2* | 12/2024 | Kakishima | H04B 7/0695 |
| 2010/0172255 | A1* | 7/2010 | Cook | H04L 43/50 |
| | | | | 370/252 |
| 2016/0373334 | A1* | 12/2016 | Gintis | H04L 43/50 |
| 2019/0174341 | A1* | 6/2019 | Chincholi | H04B 17/336 |
| 2019/0297552 | A1* | 9/2019 | Joseph | H04L 1/0009 |
| 2020/0015258 | A1* | 1/2020 | Zhou | H04W 72/23 |
| 2020/0267756 | A1* | 8/2020 | Fakoorian | H04W 72/23 |
| 2022/0030546 | A1* | 1/2022 | Nam | H04W 68/02 |
| 2022/0038207 | A1* | 2/2022 | Frenne | H04L 1/0072 |
| 2022/0116850 | A1* | 4/2022 | Ahn | H04W 88/04 |
| 2022/0116881 | A1* | 4/2022 | Shin | H04W 52/14 |
| 2022/0116972 | A1* | 4/2022 | Liu | H04L 1/08 |
| 2022/0158926 | A1* | 5/2022 | Wennerström | H04L 41/0853 |
| 2022/0256571 | A1* | 8/2022 | Lo | H04L 5/0094 |
| 2022/0345923 | A1* | 10/2022 | Gao | H04W 24/10 |
| 2022/0369352 | A1* | 11/2022 | Huang | H04L 5/0094 |
| 2022/0385384 | A1* | 12/2022 | Jiang | H04B 7/063 |
| 2022/0417900 | A1* | 12/2022 | Li | H04W 68/02 |
| 2023/0050541 | A1* | 2/2023 | Yi | H04L 1/1822 |
| 2023/0112099 | A1* | 4/2023 | Lei | H04L 1/1819 |
| | | | | 370/329 |
| 2023/0135507 | A1* | 5/2023 | Taherzadeh Boroujeni | |
| | | | | H04L 1/0026 |
| | | | | 370/329 |
| 2023/0421321 | A1* | 12/2023 | Abedini | H04L 1/08 |
| 2024/0040584 | A1* | 2/2024 | Yuan | H04W 72/046 |

FOREIGN PATENT DOCUMENTS

| | | |
|---|---|---|
| WO | 2020006416 A1 | 1/2020 |
| WO | 2022185184 A1 | 9/2022 |

\* cited by examiner

PDCCH REPETITION CONFIGURATION BASED ON L1 REPORT

TECHNICAL FIELD

The present disclosure relates generally to communication systems, and more particularly, to a method of wireless communication including configuration of physical downlink control channel (PDCCH) repetition based on physical layer (L1) report from a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) and a base station. The UE may transmit, to the base station, at least one of a physical layer (L1) report of the current beam. The base station may receive the at least one of the L1 report or a CSI feedback of the current beam from the UE, and transmit at least one physical downlink control channel (PDCCH) repetition based on a first repetition option associated with the L1 report received from the UE. The UE may receive, from the base station, the PDCCH repetition based on the first repetition option associated with the L1 report received from the UE. The base station and the UE may communicate physical downlink shared channel (PDSCH) or physical uplink shared channel (PUSCH) scheduled by the at least one PDCCH repetition based on the first repetition option associated with the L1 report or the CSI feedback.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
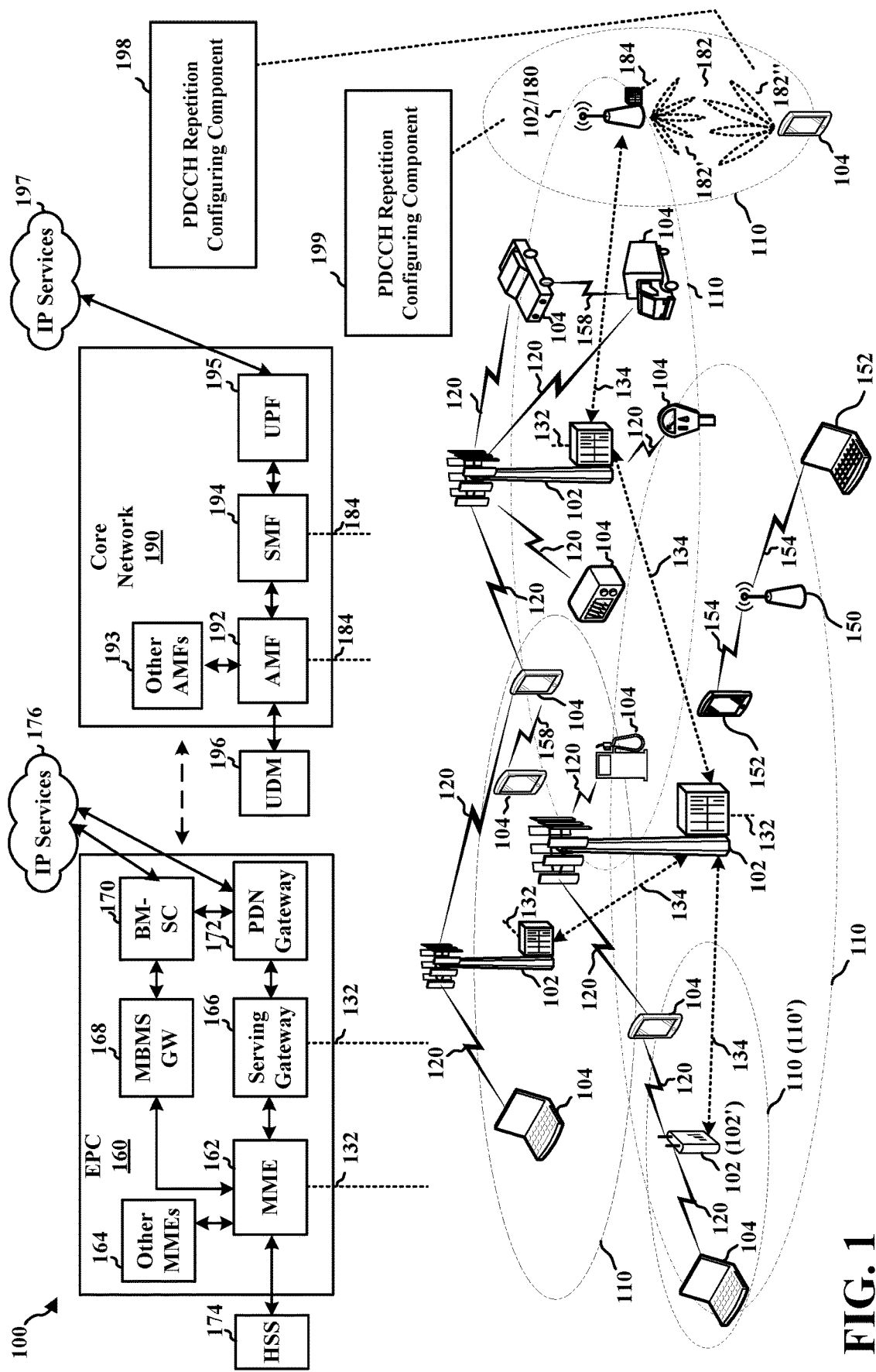
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a PDCCH repetition configuring component 198 configured to transmit at least one of an L1 report or a CSI to a base station, and receive at least one PDCCH repetition based on a first repetition option associated with the L1 report or the CSI feedback. In certain aspects, the base station 180 may include a PDCCH repetition configuring component 199 configured to receive at least one of an L1 report or CSI from a UE, and transmit at least one PDCCH repetition based on a first repetition option associated with the L1 report or the CSI feedback received from the UE. Although the following description may be focused on 5G NR, the concepts described herein may be applicable to other similar areas, such as LTE, LTE-A, CDMA, GSM, and other wireless technologies.

Figure 2:
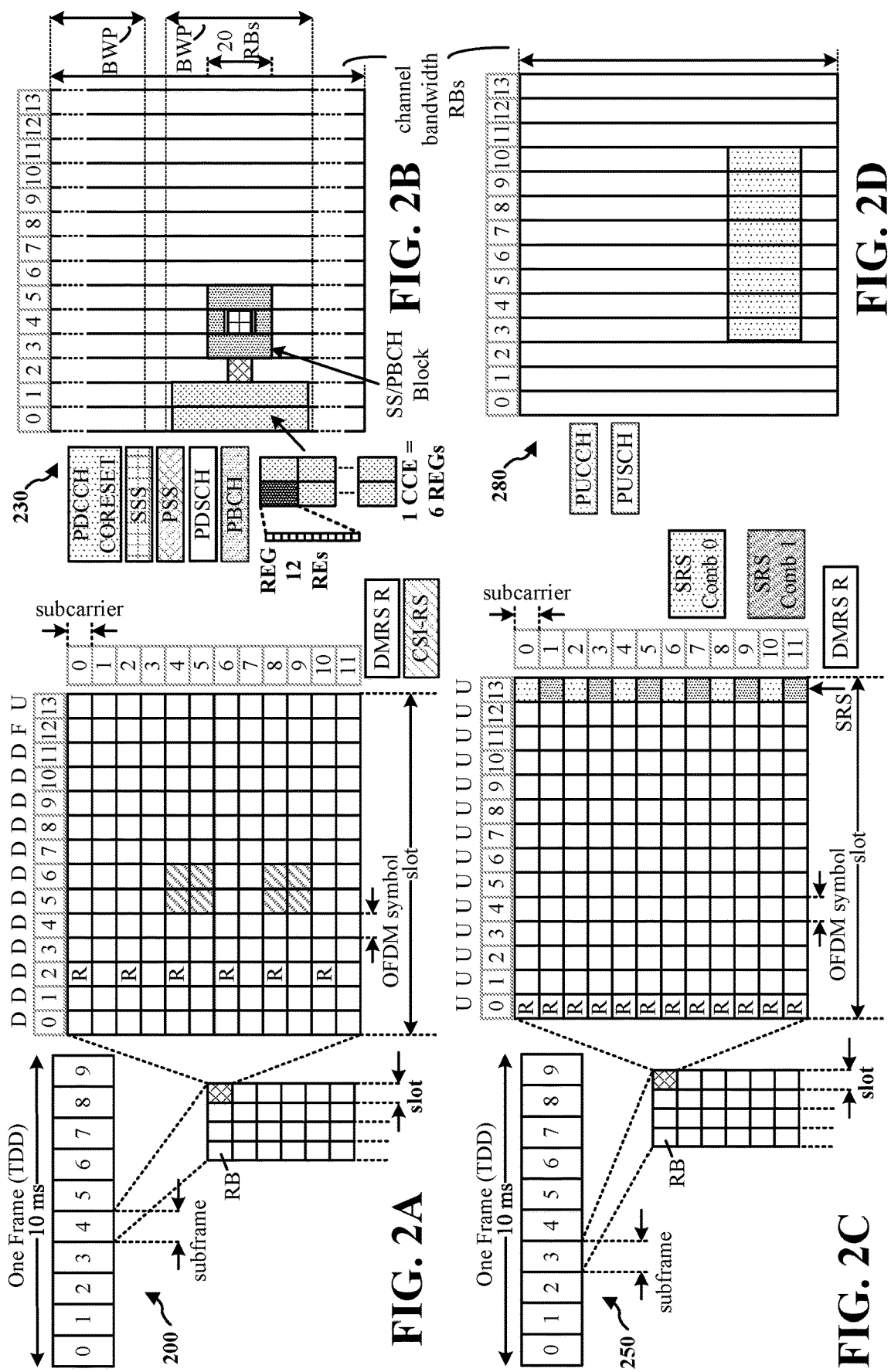
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
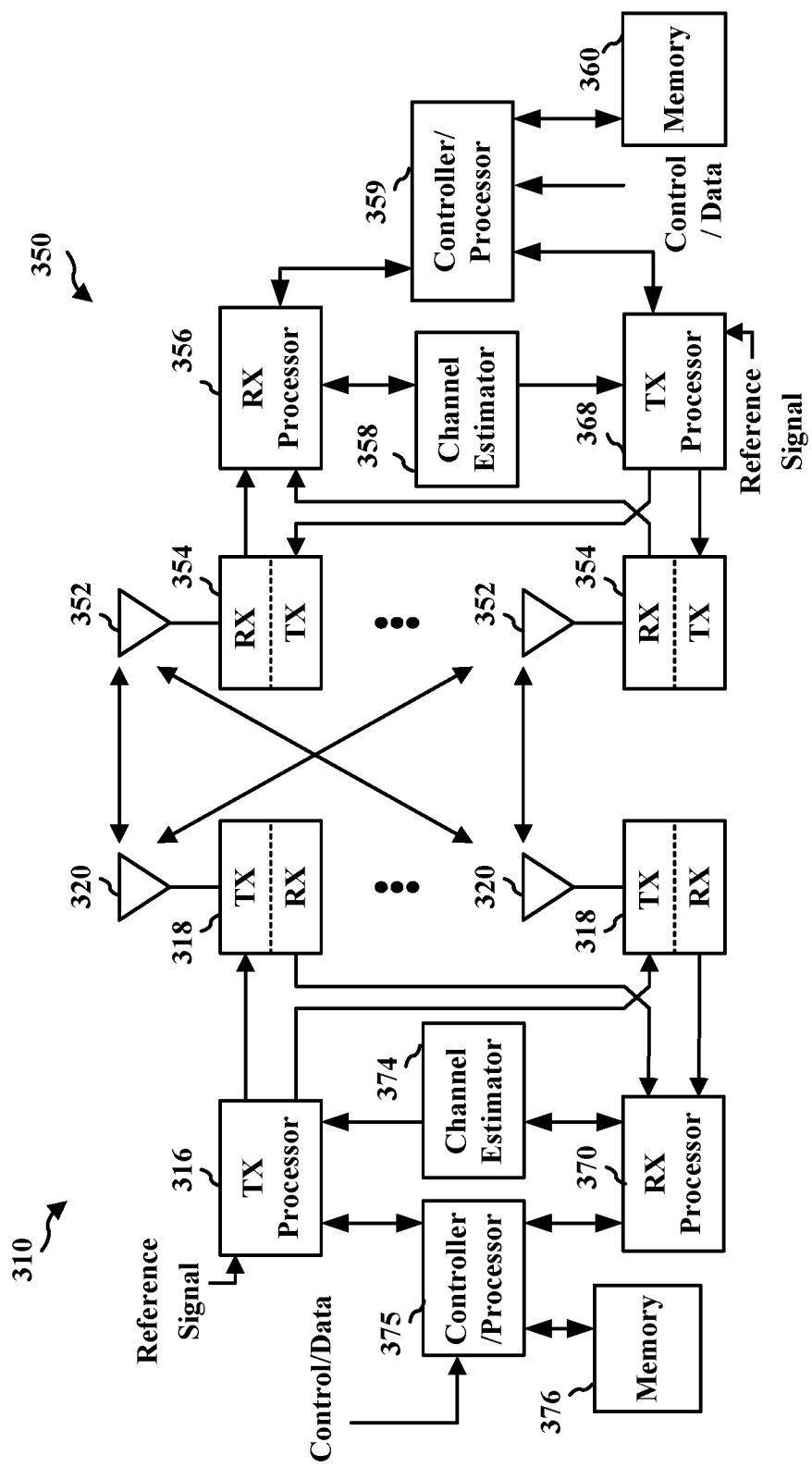
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects, a channel condition between a base station and a UE may change. That is, the distance between the base station and the UE may change, an obstruction may be introduced between the base station and the UE to block the beam, or the UE may experience interference based on transmissions from another wireless device. Based on the change of the channel condition, the base station may change the resource allocation and modulation and coding scheme (MCS) for data transmission to be more appropriate for the current channel conditions. This process may be referred to a link adaptation, matching of the MCS and other signal and protocol parameters to the conditions on the radio link.

Aspects presented herein provide for a link adaptation that may be applied to physical downlink control channel (PDCCH). In some aspects, the link adaptations for the PDCCH may include PDCCH repetition to provide coverage enhancement. That is, the base station may transmit PDCCH in a search space, and the UE may search (e.g., monitor or estimate) the search space to receive the PDCCH transmitted by the base station. The base station may transmit a plurality of PDCCHs including repetitions of the PDCCH to improve the coverage.

The PDCCH including downlink control information (DCI) may schedule a physical downlink shared channel (PDSCH) and a physical uplink shared channel (PUSCH). To configure the resource allocation for the scheduled PDSCH and PUSCH, the DCI may include a number of parameters. The parameters may include at least one of K0, K1, or K2, where the K0 and K2 may indicate time offset (in terms of number of slots) between the scheduling PDCCH (including the DCI) and the scheduled PDSCH and PUSCH, respectively. That is, the K0 may be a first offset between the scheduling PDCCH and the scheduled PDSCH, and the K2 may be third offset between the scheduling PDCCH and the scheduled PUSCH. The K1 may refer to a second offset between the scheduled PDSCH and an ACK/NACK feedback for the scheduled PDSCH.

In some aspects, the base station and the UE may be configured to provide certain level of dynamic link adaptation and/or coverage enhancement for PDCCH. In one aspect, the PDCCH repetition may be linked to the one or more previous L1 reports or other CSI feedbacks. That is, the PDCCH repetition may be associated with the L1 reports or the other CSI feedbacks previously communicated between the base station and the UE, and the base station and the UE may select one PDCCH repetition configuration based on the previous L1 reports or the other CSI feedbacks. The base station may transmit the PDCCH repetition based on the PDDCH repetition configuration, and the UE may receive the PDCCH repetition in paired search spaces or multiple monitoring occasions based on the PDDCH repetition configuration.

Figure 4:
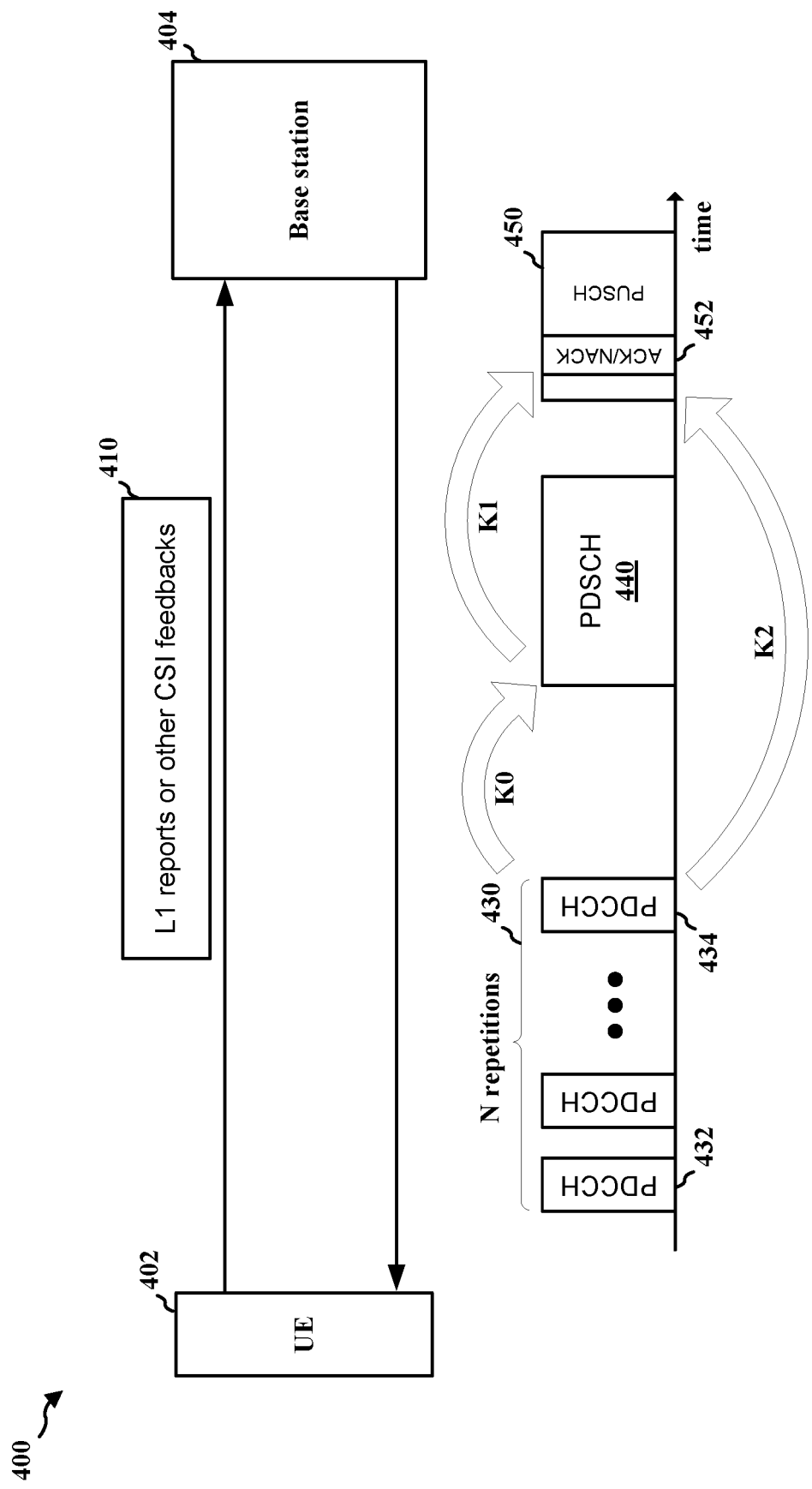
FIG. 4 is a diagram illustrating an example of PDCCH repetition in wireless communication.

FIG. 4 is a diagram illustrating an example 400 of PDCCH repetition in wireless communication. The example 400 of the PDCCH repetition may include a UE 402 and a base station 404. The UE 402 may generate and transmit physical layer (L1) reports 410 (or other CSI feedback) for a plurality of beams received from the base station. Here, the L1 reports 410 may include at least one of channel quality indicator (CQI), an L1 reference signal received power (RSRP) (L1-RSRP), an L1 signal-to-interference-plus-noise (SINR) (L1-SINR), or the CSI feedback. For example, the base station may transmit a CSI-RS on each of multiple beams (e.g., beams 182'). The UE may measure the CSI-RS received on one or more beams and transmit CSI to the base station based on the measurements.

The base station may receive the L1 reports 410 from the UE, and determine a set of associated beams (e.g., one or more of 182') for transmitting the PDCCH repetitions 430 based on the L1 reports 410 received from the UE. In one aspect, the PDCCH repetitions 430 may be transmitted over a set of paired search spaces, and the base station may determine the set of paired search spaces based on the L1 report 410 received from the UE.

The base station may repeat the UE-specific PDCCH transmissions, e.g., PDCCH repetitions 430, over multiple paired search spaces or over multiple aggregated monitoring occasions, e.g., aggregated monitoring occasions of the same search space, implicitly based on the L1 reports 410. In one aspect, the base station may configure the PDCCH repetitions 430 over the multiple paired search spaces based on the L1 reports 410. In another aspect, the base station may configure the PDCCH repetitions 430 over the multiple aggregated monitoring occasions based on the L1 reports 410. In another aspect, the base station may configure the PDCCH repetitions 430 over the multiple paired search spaces or the multiple aggregated monitoring occasions based on a history (or a trend) of the L1 reports 410.

Different repetition option of PDCCH may be configured as part of search space configuration. That is, the base station may transmit, to the UE, the search space configuration including one or more PDCCH repetition options, and the one or more PDCCH repetition options may be associated with the L1 reports 410.

In some aspect, at least one PDCCH repetition option of the configured one or more PDCCH repetition options may include PDCCH repetitions 430 over multiple beams. In one aspect, the set of paired search spaces may be based on the reported beams and the associated beam (or TCI state) for the CORESETs associated with the corresponding search spaces. For example, a first CORESET may be associated with a first beam (e.g., first TCI state) and a second CORESET may be associated with a second beam (e.g., a second TCI state). If the report indicates that beam 1 is the better beam, the UE may monitor for PDCCH in the first CORESET. If the report indicates that beam 2 is the better beam, the UE may monitor for the PDCCH in the second CORESET.

In some aspects, different PDCCH repetition options may be linked to different ranges of CQI, reported L1-RSRP, L1-SINR or a combination or a history of them. That is, the base station and the UE may select an PDCCH repetition option of the PDCCH repetition options based on the reported L1 reports 410, and the base station may transmit the PDCCH repetitions 430 and the UE may receive the PDCCH repetitions 430 based on the selected PDCCH repetition option.

In some aspects, different PDCCH repetition options may be activated depending on thresholds on of the CQI, the reported L1-RSRP, the L1-SINR, or the combination or the history of them. That is, the base station may configure the UE with threshold values for the CQI, the L1-RSRP, or the L1-SINR of the current beam, and the UE may determine to activate one or more PDCCH repetition options based on the at least one of the CQI, the reported L1-RSRP, or the L1-SINR meeting the corresponding threshold values, particularly in semi-persistent scheduling (SPS) configurations. In a first example, the UE may monitor for PDCCH with repetitions if the CSI, L1-RSRP, or L1-SINR meets a threshold and may monitor for PDCCH without repetition if the CSI, L1-RSRP, or L1-SINR does not meet the threshold. In some aspects, there may be multiple thresholds and multiple repetition options. As an example, if the CSI, L1-RSRP, or L1-SINR does not meet a first threshold, the UE may monitor for the PDCCH without repetition. If the CSI, L1-RSRP, or L1-SINR meets a first threshold, the UE may monitor for the PDCCH based on a first number of repetitions. If the CSI, L1-RSRP, or L1-SINR meets a second threshold, the UE may monitor for the PDCCH based on a second number of repetitions. Although this example is described for two repetitions, the UE may compare the CSI, L1-RSRP, or L1-SINR to more than two thresholds, in some aspects. In some aspects, the threshold value of the L1-RSRP or the L1-SINR may be indicated as a 7-bit string.

In one example, the current beam may not be the best beam, and the L1 reports 410 may indicate its value as a 4-bit differential with respect to the best beam. The UE may use an equivalent 7-bit value for comparison to the threshold after converting the reported differential value to the absolute value.

Figure 5:
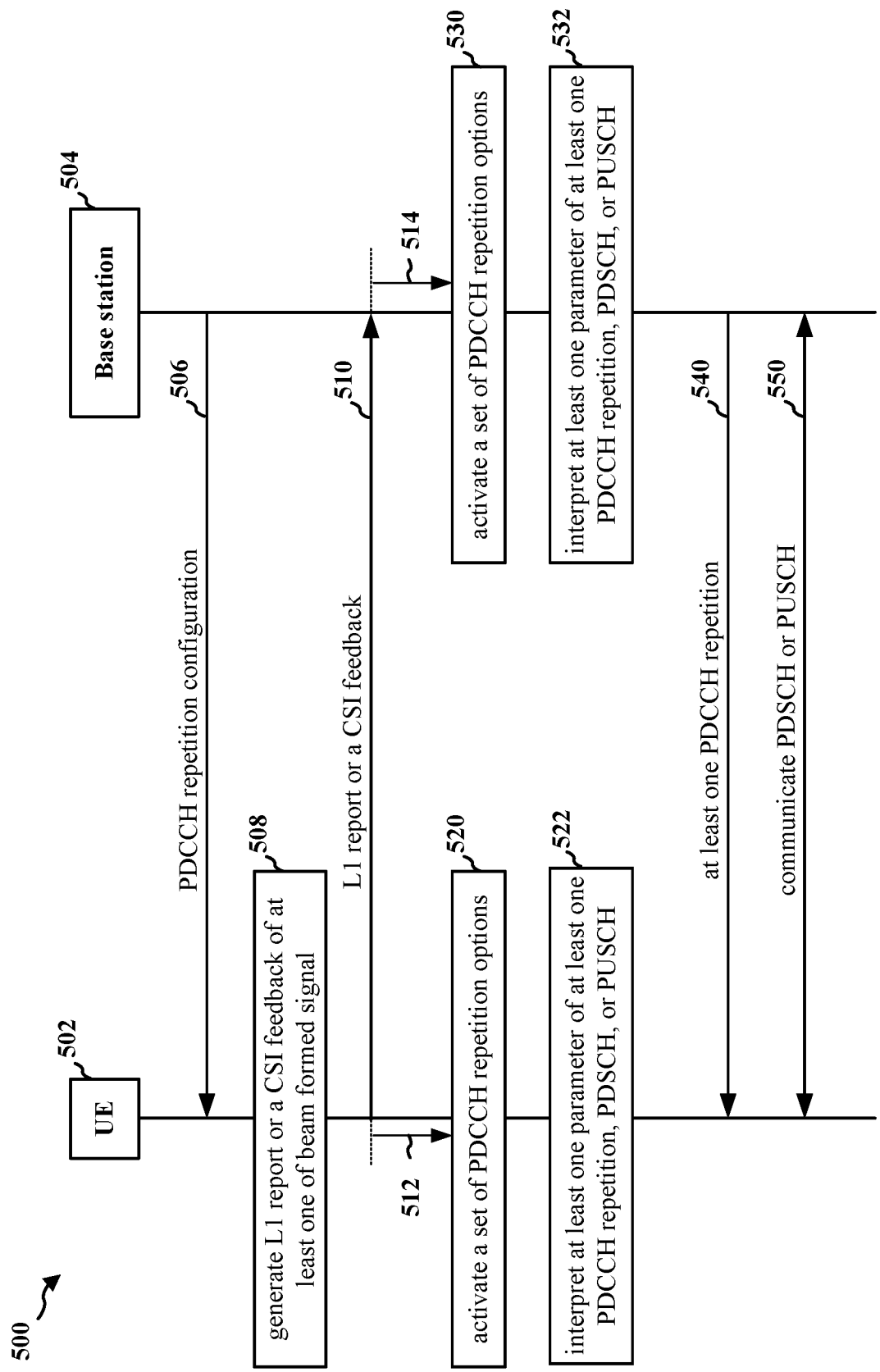
FIG. 5 is a call-flow diagram of a method of wireless communication.

The activation of the new PDCCH repetition options may happen considering a (configured or specified) processing time of the associated L1 reports 410. That is, the base station and the UE may be configured or specified with a processing time of the L1 reports 410, and apply the new PDCCH repetition options based on the associated L1 reports 410 after the processing time. FIG. 5 illustrates an example of a time 512 at the UE between transmission of the report 510 and activation of the new PDCCH repetition options, at 520, and a time 514 at the base station between reception of the report 510 and activation of the new PDCCH repetition options, at 530.

In some aspects, the PDCCH repetitions 430 including downlink control information (DCI) may schedule a physical downlink shared channel (PDSCH) 440 and a physical uplink shared channel (PUSCH). To configure the resource allocation for the scheduled PDSCH 440 or PUSCH 450, the DCI may include a number of parameters. The parameters may include at least one of K0, K1, or K2, where the K0 and K2 may indicate time offset (in terms of number of slots) between the scheduling PDCCH repetitions 430 (including the DCI) and the scheduled PDSCH 440 or PUSCH 450, respectively. That is, the K0 may be a first offset between the scheduling PDCCH repetitions 430 and the scheduled PDSCH 440, and the K2 may be third offset between the scheduling PDCCH repetitions 430 and the scheduled PUSCH. The K1 may refer to a second offset between the scheduled PDSCH 440 and an ACK/NACK 452 feedback for the scheduled PDSCH 440.

In one aspect, the at least one of the K0 or the K2 (or the K1) may be interpreted with respect to the last PDCCH repetition 434 among the PDCCH repetitions 430. That is, the base station and the UE may determine resources allocated for the scheduled PDSCH 440 or PUSCH 450 (or the Ack/Nack 452 for scheduled PDSCH 440) based on time offsets the K0 or the K2 (or the K1) from the last PDCCH repetition 434 among the PDCCH repetitions 430.

In another aspect, the at least one of the K0 or the K2 (or the K1) may be interpreted with respect to the first PDCCH repetition 432 among the PDCCH repetitions 430. That is, the base station and the UE may determine resources allocated for the scheduled PDSCH 440 or PUSCH 450 (or the Ack/Nack 452 for scheduled PDSCH 440) based on time offsets the K0 or the K2 (or the K1) from the first PDCCH repetition 432 among the PDCCH repetitions 430.

In some aspects, the at least one of the K0 or the K2 (or the K1) may be interpreted depending on how the PDCCH copies are added to form the PDCCH repetitions 430, e.g., the PDCCH copies may be added after the regular PDCCH occasion or before the regular PDCCH occasion.

In some aspects, the at least one of the K0 or the K2 (or the K1) may be interpreted depending on whether the PDCCH repetitions 430 are transmitted over multiple monitoring occasions of the same search space or over linked monitoring occasions of two (or multiple) search spaces. In some aspects, the at least one of the K0 and the K2 (or the K1) may depend on the presence of intra-slot repetition of the PDCCH repetitions 430.

FIG. 5 is a call-flow diagram 500 of a method of wireless communication. The call-flow diagram 500 may include a UE 502 and a base station 504. The UE 502 may transmit at least one of an L1 report or a CSI feedback of the current beam to the base station 504. The base station 504 may receive the at least one of an L1 report or a CSI feedback of the current beam from the UE 502, and transmit at least one PDCCH repetition based on a first repetition option associated with the L1 report or the CSI feedback received from the UE 502. The UE 502 may receive, from the base station 504, the PDCCH repetition based on the first repetition option associated with the L1 report or the CSI feedback received from the UE 502.

At 506, the base station 504 may transmit a configuration of the PDCCH repetition to the UE 502. The UE 502 may receive a configuration of the PDCCH repetition from the base station 504. Here, the configuration may be a search space configuration. In one aspect, the configuration of the PDCCH repetition may include a plurality of repetition options including the first repetition option associated with the L1 report or the CSI feedback. In another aspect, the configuration of the PDCCH repetition may be associated with a threshold value or a range of the L1 report or the CSI feedback, where the set of repetition options may be activated by the base station 504 or the UE 502 based on the at least one L1 report or the CSI feedback of the current beam being within the range or meeting the threshold value.

At 508, the UE 502 may generate at least one of an L1 report or a CSI feedback of at least one of beam formed signal. Here, the L1 report may include at least one of CQI, an L1-RSRP, an L1-SINR, or a CSI feedback. At 510, the UE 502 may transmit at least one of an L1 report or a CSI feedback to a base station 504. The base station 504 may receive at least one of an L1 report or CSI feedback from the UE 502.

At 520, the UE 502 may activate a set of repetition options based on the at least one L1 report or CSI feedback of a current beam, the set of repetition options including the first repetition option. In one aspect, the set of repetition options may be activated by the UE 502 based on the at least one L1 report or the CSI feedback of the current beam being within the range or meeting the threshold value received in the configuration of the PDCCH repetition received at 506. In one aspect, the set of repetition options may be activated after a processing time 512 following transmission of the at least one L1 report.

At 522, the UE 502 may interpret at least one parameter associated with the at least one PDCCH repetition, a scheduled PDSCH, or a scheduled PUSCH based on the first repetition option. Here, the at least one parameter may include at least one of a first offset between the at least one PDCCH repetition and the scheduled PDSCH (K0), a second offset between the scheduled PDSCH and an ACK/NACK feedback for the scheduled PDSCH (K1), and a third offset between the at least one PDCCH repetition and the scheduled PUSCH (K2).

At 530, the base station 504 may activate a set of repetition options based on the at least one L1 report or CSI feedback of a current beam, the set of repetition options including the first repetition option. In one aspect, the set of repetition options may be activated by the base station 504 based on the at least one L1 report or the CSI feedback of the current beam being within the range or meeting the threshold value received in the configuration of the PDCCH repetition received at 506. In one aspect, the set of repetition options may be activated after a processing time 514 following reception of the at least one L1 report.

At 532, the base station 504 may interpret at least one parameter associated with the at least one PDCCH repetition, a scheduled PDSCH, or a scheduled PUSCH based on the first repetition option. Here, the at least one parameter may include at least one of a first offset between the at least one PDCCH repetition and the scheduled PDSCH (K0), a second offset between the scheduled PDSCH and an ACK/NACK feedback for the scheduled PDSCH (K1), and a third offset between the at least one PDCCH repetition and the scheduled PUSCH (K2).

In one aspect, at least one of the K0, the K1, or the K2 may be interpreted based on a last PDCCH repetition of the at least one PDCCH repetition. In another aspect, the at least one of the K0, the K1, or the K2 may be interpreted based on a first PDCCH repetition of the at least one PDCCH repetition. In another aspect, the at least one of the K0, the K1, or the K2 may be interpreted based on a number of the at least one PDCCH repetition. In another aspect, the at least one of the K0, the K1, or the K2 may be interpreted based on whether the at least one PDCCH repetition is received over a set of multiple beams or a set of paired search spaces. In another aspect, the at least one of the K0, the K1, or the K2 may be interpreted based on whether the at least one PDCCH repetition includes intra-slot repetition.

At 540, the base station 504 may transmit at least one PDCCH repetition based on the first repetition option associated with the L1 report or the CSI feedback received from the UE 502. The UE 502 may receive at least one PDCCH repetition based on the first repetition option associated with the L1 report or the CSI feedback. In one aspect, the at least one PDCCH repetition may be transmitted or received over at least one beam for a set of CORESETs associated with the set of paired search spaces. In another aspect, the at least one PDCCH repetition is transmitted or received over at least one beam for a set of CORESETs associated with the set of paired search spaces. In another aspect, the first repetition option may indicate a set of multiple beams for the PDCCH repetition, and the set of multiple beams being based at least partially on the at least one L1 report. In another aspect, the first repetition option may indicate that the at least one PDCCH repetition is received over a set of paired search spaces, the set of paired search spaces may be determined at least on partially based on the at least one L1 report.

At 550, the base station 504 and the UE 502 may communicate the PDSCH or the PUSCH scheduled by the at least one PDCCH repetition. Here, the PDSCH or the PUSCH may be scheduled based on the K0, the K1, or the K2 interpreted based on the at least one PDCCH repetition at 522 and 532.

Figure 6:
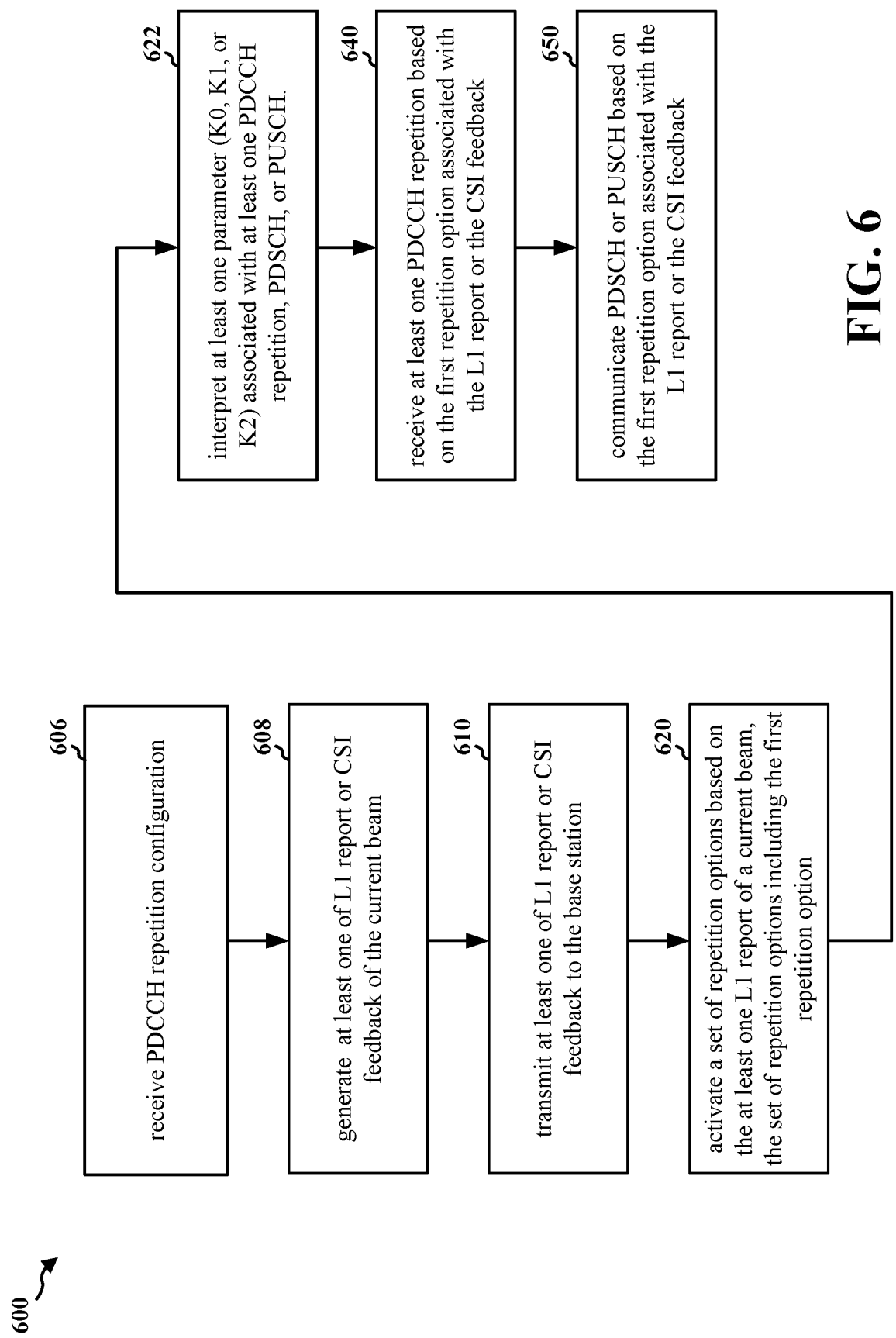
FIG. 6 is a flowchart of a method of wireless communication.

FIG. 6 is a flowchart 600 of a method of wireless communication. The method may be performed by a UE (e.g., the UE 104/402/502; the apparatus 1002). The UE may transmit at least one of an L1 report or a CSI feedback of the current beam to a base station. The UE may receive, from the base station, the PDCCH repetition based on the first repetition option associated with the L1 report or the CSI feedback received from the UE.

At 606, the UE may receive a configuration of the PDCCH repetition from the base station. Here, the configuration may be a search space configuration. In one aspect, the configuration of the PDCCH repetition may include a plurality of repetition options including the first repetition option associated with the L1 report or the CSI feedback. In another aspect, the configuration of the PDCCH repetition may be associated with a threshold value or a range of the L1 report or the CSI feedback, where the set of repetition options may be activated by the UE based on the at least one L1 report or the CSI feedback of the current beam being within the range or meeting the threshold value. For example, at 506, the UE 502 may receive a configuration of the PDCCH repetition from the base station 504. Furthermore, 606 may be performed by a PDCCH repetition configuring component 1040.

At 608, the UE may generate at least one of an L1 report or a CSI feedback of at least one of beam formed signal. At 610, the UE may transmit at least one of an L1 report or a CSI feedback to a base station. Here, the L1 report may include at least one of CQI, an L1-RSRP, an L1-SINR, or a CSI feedback. For example, at 508, the UE may generate at least one of an L1 report or a CSI feedback of at least one of beam formed signal, and at 510, the UE 502 may transmit at least one of an L1 report or a CSI feedback to a base station 504. Furthermore, 608 and 610 may be performed by an L1 report/CSI feedback component 1042.

At 620, the UE may activate a set of repetition options based on the at least one L1 report or CSI feedback of a current beam, the set of repetition options including the first repetition option. In one aspect, the set of repetition options may be activated by the UE based on the at least one L1 report or the CSI feedback of the current beam being within the range or meeting the threshold value received in the configuration of the PDCCH repetition received at 606. In one aspect, the set of repetition options may be activated after a processing time following transmission of the at least one L1 report. For example, at 520, the UE 502 may activate a set of repetition options based on the at least one L1 report or CSI feedback of a current beam, the set of repetition options including the first repetition option. Furthermore, 620 may be performed by the PDCCH repetition configuring component 1040.

At 622, the UE may interpret at least one parameter associated with the at least one PDCCH repetition, a scheduled PDSCH, or a scheduled PUSCH based on the first repetition option. Here, the at least one parameter may include at least one of a first offset between the at least one PDCCH repetition and the scheduled PDSCH (K0), a second offset between the scheduled PDSCH and an ACK/NACK feedback for the scheduled PDSCH (K1), and a third offset between the at least one PDCCH repetition and the scheduled PUSCH (K2). For example, at 522, the UE 502 may interpret at least one parameter associated with the at least one PDCCH repetition, a scheduled PDSCH, or a scheduled PUSCH based on the first repetition option. Furthermore, 622 may be performed by a PDSCH/PUSCH configuring component 1044.

In one aspect, at least one of the K0, the K1, or the K2 may be interpreted based on a last PDCCH repetition of the at least one PDCCH repetition. In another aspect, the at least one of the K0, the K1, or the K2 may be interpreted based on a first PDCCH repetition of the at least one PDCCH repetition. In another aspect, the at least one of the K0, the K1, or the K2 may be interpreted based on a number of the at least one PDCCH repetition. In another aspect, the at least one of the K0, the K1, or the K2 may be interpreted based on whether the at least one PDCCH repetition is received over a set of multiple beams or a set of paired search spaces. In another aspect, the at least one of the K0, the K1, or the K2 may be interpreted based on whether the at least one PDCCH repetition includes intra-slot repetition.

At 640, the UE may receive at least one PDCCH repetition based on the first repetition option associated with the L1 report or the CSI feedback. In one aspect, the at least one PDCCH repetition may be transmitted or received over at least one beam for a set of CORESETs associated with the set of paired search spaces. In another aspect, the at least one PDCCH repetition is transmitted or received over at least one beam for a set of CORESETs associated with the set of paired search spaces. In another aspect, the first repetition option may indicate a set of multiple beams for the PDCCH repetition, and the set of multiple beams being based at least partially on the at least one L1 report. In another aspect, the first repetition option may indicate that the at least one PDCCH repetition is received over a set of paired search spaces, the set of paired search spaces may be determined at least on partially based on the at least one L1 report. For example, at 540, the UE 502 may receive at least one PDCCH repetition based on the first repetition option associated with the L1 report or the CSI feedback. Furthermore, 640 may be performed by a DL/UL communication component 1046.

At 650, the UE may communicate, with the base station, the PDSCH or the PUSCH scheduled by the at least one PDCCH repetition. Here, the PDSCH or the PUSCH may be scheduled based on the K0, the K1, or the K2 interpreted based on the at least one PDCCH repetition at 622. For example, at 550, the UE 502 may communicate, with the base station 504, the PDSCH or the PUSCH scheduled by the at least one PDCCH repetition. Furthermore, 650 may be performed by the DL/UL communication component 1046.

Figure 7:
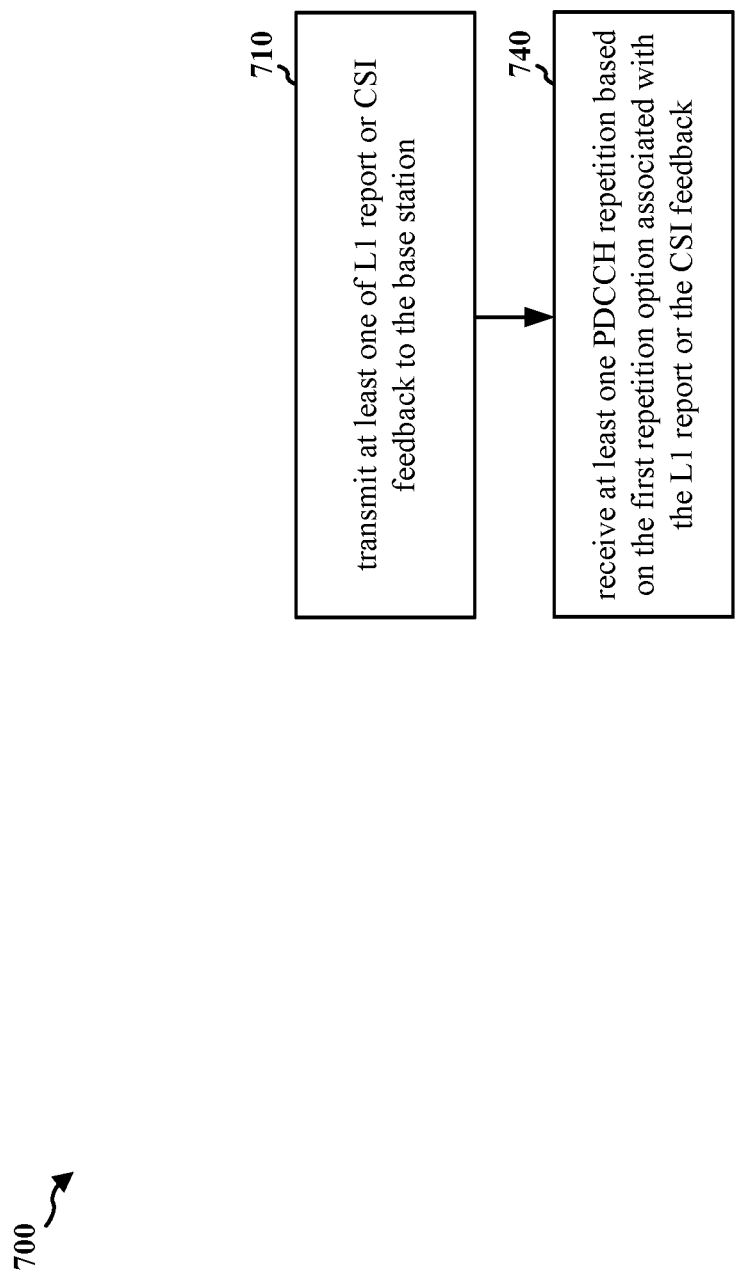
FIG. 7 is a flowchart of a method of wireless communication.

FIG. 7 is a flowchart 700 of a method of wireless communication. The method may be performed by a UE (e.g., the UE 104/402/502; the apparatus 1002). The UE may transmit at least one of an L1 report or a CSI feedback of the current beam to a base station. The UE may receive, from the base station, the PDCCH repetition based on the first repetition option associated with the L1 report or the CSI feedback received from the UE.

At 710, the UE may transmit at least one of an L1 report or a CSI feedback to a base station. Here, the L1 report may include at least one of CQI, an L1-RSRP, an L1-SINR, or a CSI feedback. For example, at 510, the UE 502 may transmit at least one of an L1 report or a CSI feedback to a base station 504. Furthermore, 710 may be performed by an L1 report/CSI feedback component 1042.

At 740, the UE may receive at least one PDCCH repetition based on the first repetition option associated with the L1 report or the CSI feedback. In one aspect, the at least one PDCCH repetition may be transmitted or received over at least one beam for a set of CORESETs associated with the set of paired search spaces. In another aspect, the at least one PDCCH repetition is transmitted or received over at least one beam for a set of CORESETs associated with the set of paired search spaces. In another aspect, the first repetition option may indicate a set of multiple beams for the PDCCH repetition, and the set of multiple beams being based at least partially on the at least one L1 report. In another aspect, the first repetition option may indicate that the at least one PDCCH repetition is received over a set of paired search spaces, the set of paired search spaces may be determined at least on partially based on the at least one L1 report. For example, at 540, the UE 502 may receive at least one PDCCH repetition based on the first repetition option associated with the L1 report or the CSI feedback. Furthermore, 740 may be performed by a DL/UL communication component 1046.

Figure 8:
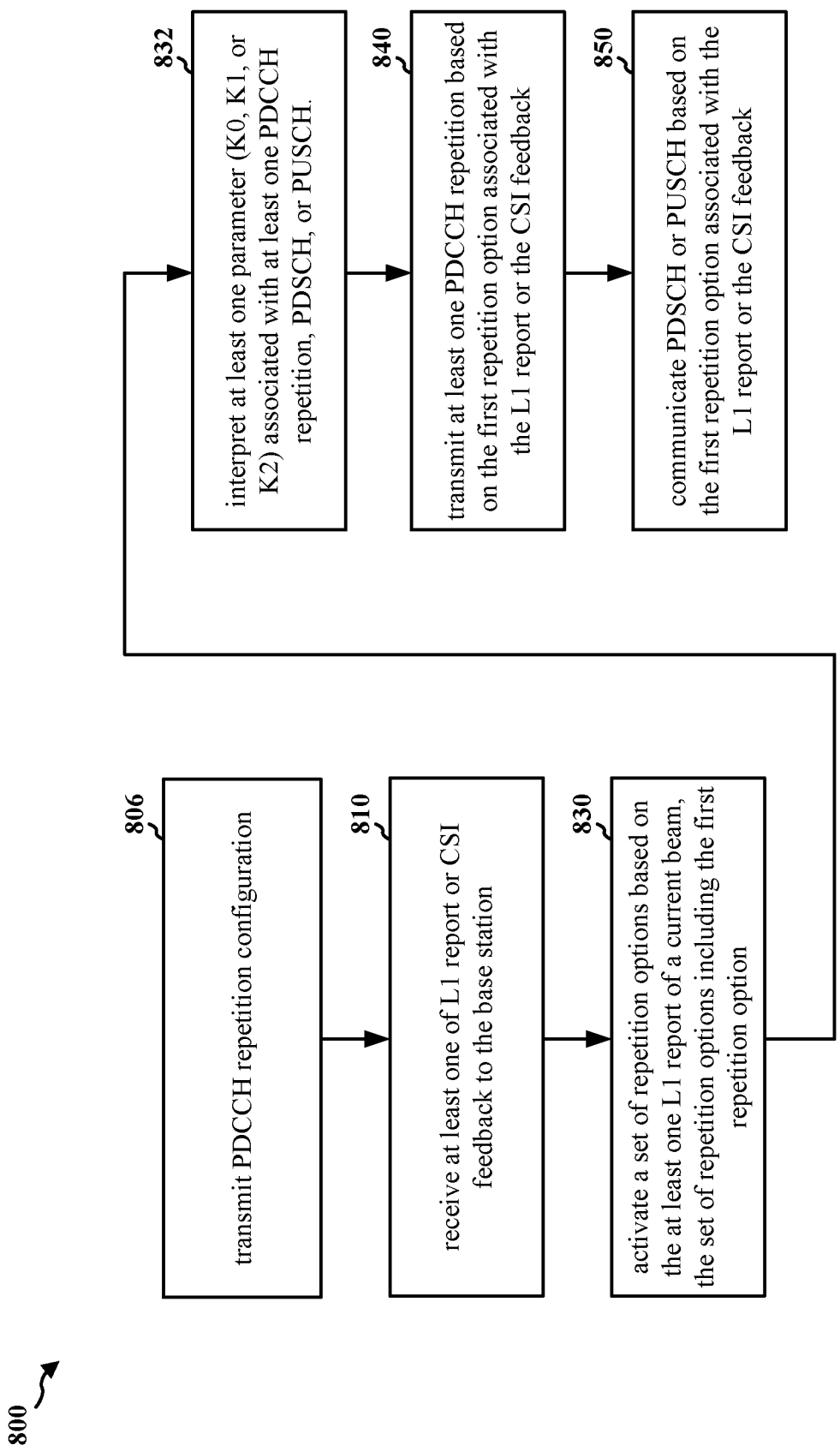
FIG. 8 is a flowchart of a method of wireless communication.

FIG. 8 is a flowchart 800 of a method of wireless communication. The method may be performed by a base station (e.g., the base station 102/180/404/504; the apparatus 1102). The base station may receive at least one of an L1 report or a CSI feedback of the current beam from the UE. The base station may receive the at least one of an L1 report or a CSI feedback of the current beam from the UE, and transmit at least one PDCCH repetition based on a first repetition option associated with the L1 report or the CSI feedback received from the UE.

At 806, the base station may transmit a configuration of the PDCCH repetition to the UE. Here, the configuration may be a search space configuration. In one aspect, the configuration of the PDCCH repetition may include a plurality of repetition options including the first repetition option associated with the L1 report or the CSI feedback. In another aspect, the configuration of the PDCCH repetition may be associated with a threshold value or a range of the L1 report or the CSI feedback, where the set of repetition options may be activated by the base station based on the at least one L1 report or the CSI feedback of the current beam being within the range or meeting the threshold value. For example, at 506, the base station 504 may transmit a configuration of the PDCCH repetition to the UE 502. Furthermore, 806 may be performed by a PDCCH repetition configuring component 1140.

At 810, the base station may receive at least one of an L1 report or CSI feedback from the UE. Here, the L1 report may include at least one of CQI, an L1-RSRP, an L1-SINR, or a CSI feedback. For example, at 510, the base station 504 may receive at least one of an L1 report or CSI feedback from the UE 502. Furthermore, 810 may be performed by an L1 report/CSI feedback component 1142.

At 830, the base station may activate a set of repetition options based on the at least one L1 report or CSI feedback of a current beam, the set of repetition options including the first repetition option. In one aspect, the set of repetition options may be activated by the base station based on the at least one L1 report or the CSI feedback of the current beam being within the range or meeting the threshold value received in the configuration of the PDCCH repetition received at 806. In one aspect, the set of repetition options may be activated after a processing time following reception of the at least one L1 report. For example, at 530, the base station 504 may activate a set of repetition options based on the at least one L1 report or CSI feedback of a current beam, the set of repetition options including the first repetition option. Furthermore, 820 may be performed by the PDCCH repetition configuring component 1140.

At 832, the base station may interpret at least one parameter associated with the at least one PDCCH repetition, a scheduled PDSCH, or a scheduled PUSCH based on the first repetition option. Here, the at least one parameter may include at least one of a first offset between the at least one PDCCH repetition and the scheduled PDSCH (K0), a second offset between the scheduled PDSCH and an ACK/NACK feedback for the scheduled PDSCH (K1), and a third offset between the at least one PDCCH repetition and the scheduled PUSCH (K2). For example, at 532, the base station 504 may interpret at least one parameter associated with the at least one PDCCH repetition, a scheduled PDSCH, or a scheduled PUSCH based on the first repetition option. Furthermore, 822 may be performed by a PDSCH/PUSCH configuring component 1144.

In one aspect, at least one of the K0, the K1, or the K2 may be interpreted based on a last PDCCH repetition of the at least one PDCCH repetition. In another aspect, the at least one of the K0, the K1, or the K2 may be interpreted based on a first PDCCH repetition of the at least one PDCCH repetition. In another aspect, the at least one of the K0, the K1, or the K2 may be interpreted based on a number of the at least one PDCCH repetition. In another aspect, the at least one of the K0, the K1, or the K2 may be interpreted based on whether the at least one PDCCH repetition is received over a set of multiple beams or a set of paired search spaces. In another aspect, the at least one of the K0, the K1, or the K2 may be interpreted based on whether the at least one PDCCH repetition includes intra-slot repetition.

At 840, the base station may transmit at least one PDCCH repetition based on the first repetition option associated with the L1 report or the CSI feedback received from the UE. In one aspect, the at least one PDCCH repetition may be transmitted or received over at least one beam for a set of CORESETs associated with the set of paired search spaces. In another aspect, the at least one PDCCH repetition is transmitted or received over at least one beam for a set of CORESETs associated with the set of paired search spaces. In another aspect, the first repetition option may indicate a set of multiple beams for the PDCCH repetition, and the set of multiple beams being based at least partially on the at least one L1 report. In another aspect, the first repetition option may indicate that the at least one PDCCH repetition is received over a set of paired search spaces, the set of paired search spaces may be determined at least on partially based on the at least one L1 report. For example, at 540, the base station 504 may transmit at least one PDCCH repetition based on the first repetition option associated with the L1 report or the CSI feedback received from the UE 502. Furthermore, 840 may be performed by a DL/UL communication component 1146.

At 850, the base station may communicate, with the UE, the PDSCH or the PUSCH scheduled by the at least one PDCCH repetition. Here, the PDSCH or the PUSCH may be scheduled based on the K0, the K1, or the K2 interpreted based on the at least one PDCCH repetition at 832. For example, at 550, the base station 504 may communicate, with the UE 502, the PDSCH or the PUSCH scheduled by the at least one PDCCH repetition. Furthermore, 850 may be performed by the DL/UL communication component 1146.

Figure 9:
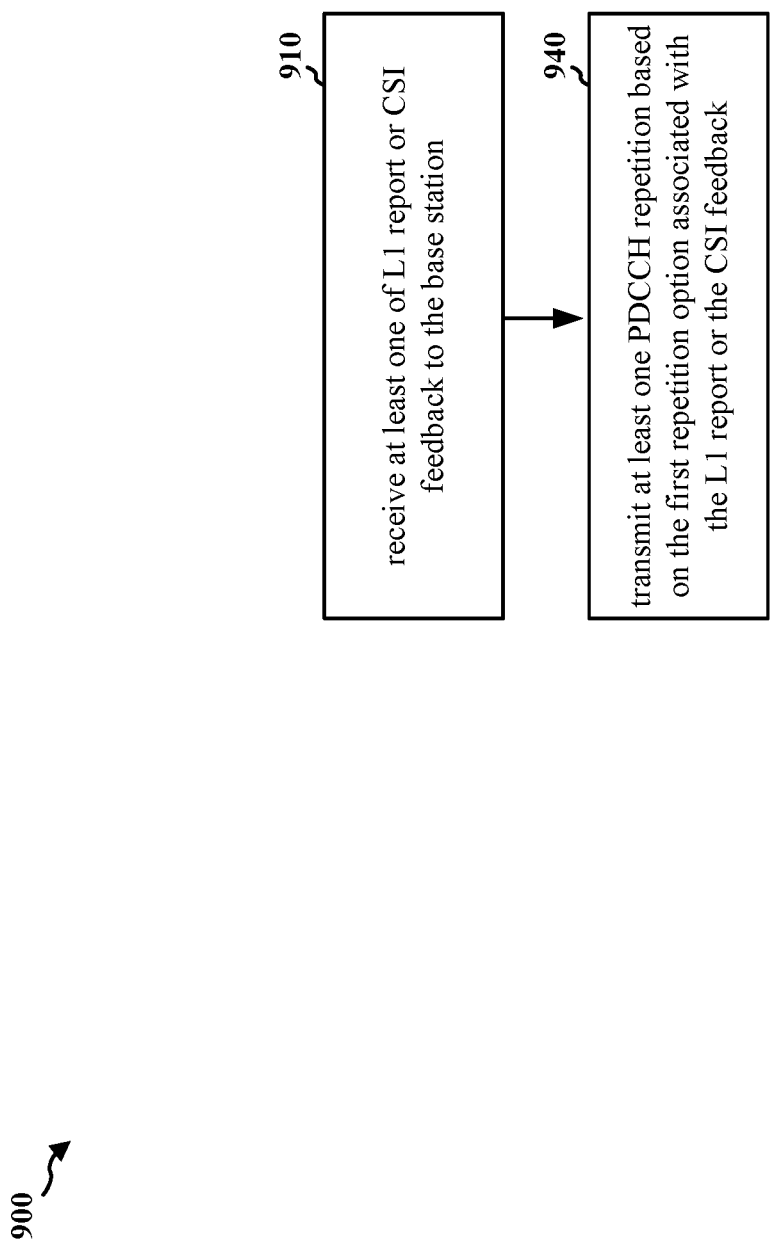
FIG. 9 is a flowchart of a method of wireless communication.

FIG. 9 is a flowchart 900 of a method of wireless communication. The method may be performed by a base station (e.g., the base station 102/180/404/504; the apparatus 1102). The base station may receive at least one of an L1 report or a CSI feedback of the current beam from the UE. The base station may receive the at least one of an L1 report or a CSI feedback of the current beam from the UE, and transmit at least one PDCCH repetition based on a first repetition option associated with the L1 report or the CSI feedback received from the UE.

At 910, the base station may receive at least one of an L1 report or CSI feedback from the UE. Here, the L1 report may include at least one of CQI, an L1-RSRP, an L1-SINR, or a CSI feedback. For example, at 510, the base station 504 may receive at least one of an L1 report or CSI feedback from the UE 502. Furthermore, 910 may be performed by an L1 report/CSI feedback component 1142.

At 940, the base station may transmit at least one PDCCH repetition based on the first repetition option associated with the L1 report or the CSI feedback received from the UE. In one aspect, the at least one PDCCH repetition may be transmitted or received over at least one beam for a set of CORESETs associated with the set of paired search spaces. In another aspect, the at least one PDCCH repetition is transmitted or received over at least one beam for a set of CORESETs associated with the set of paired search spaces. In another aspect, the first repetition option may indicate a set of multiple beams for the PDCCH repetition, and the set of multiple beams being based at least partially on the at least one L1 report. In another aspect, the first repetition option may indicate that the at least one PDCCH repetition is received over a set of paired search spaces, the set of paired search spaces may be determined at least on partially based on the at least one L1 report. For example, at 540, the base station 504 may transmit at least one PDCCH repetition based on the first repetition option associated with the L1 report or the CSI feedback received from the UE 502. Furthermore, 940 may be performed by a DL/UL communication component 1146.

Figure 10:
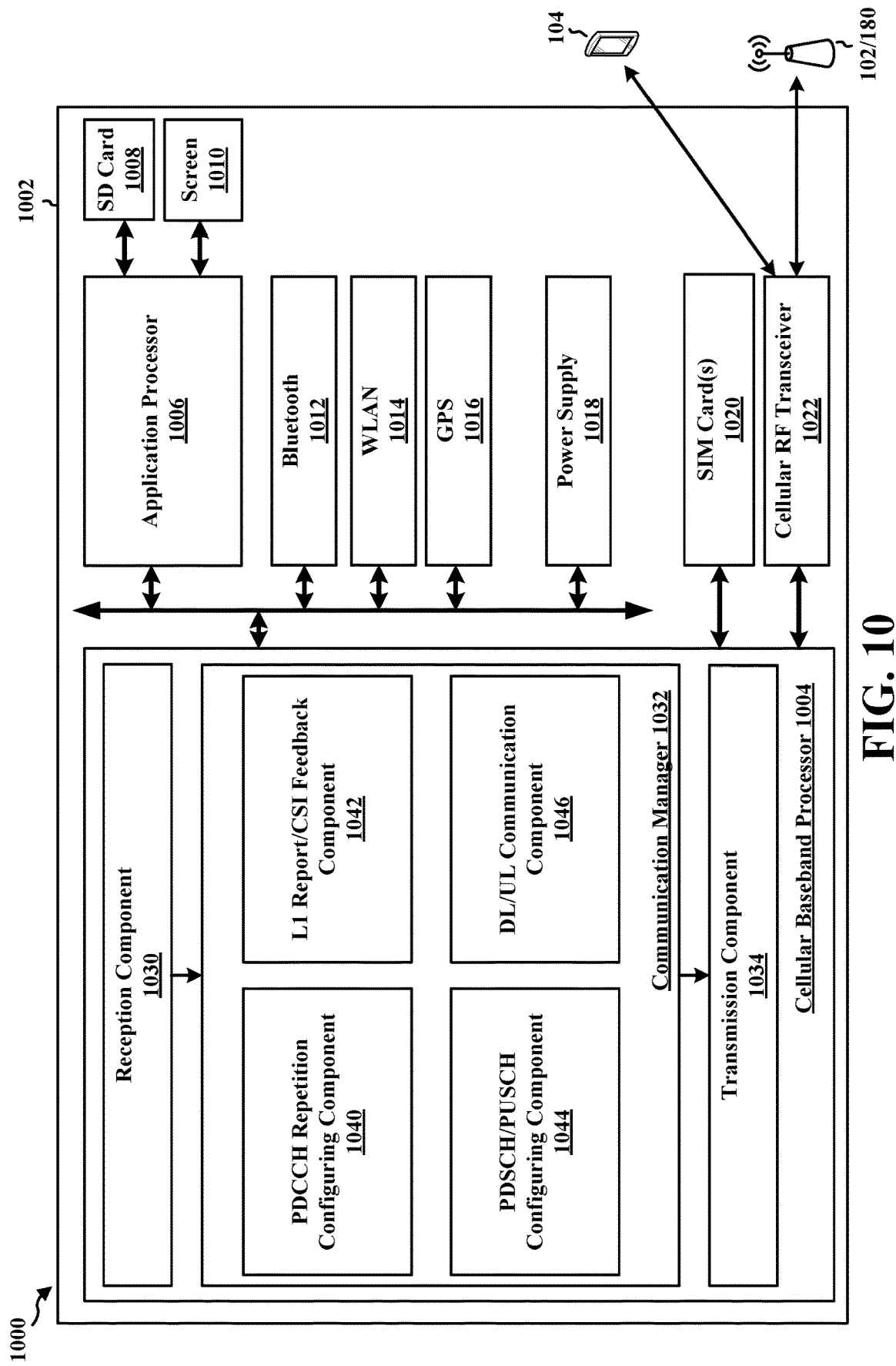
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a PDCCH repetition configuring component 1040 that is configured to receive a configuration of the PDCCH repetition from the base station, and activate a set of repetition options based on the at least one L1 report or CSI feedback of a current beam, e.g., as described in connection with 606 and 620. The communication manager 1032 further includes an L1 report/CSI feedback component 1042 that is configured to generate at least one of an L1 report or a CSI feedback of at least one of beam formed signal, and transmit at least one of an L1 report or a CSI feedback to a base station, e.g., as described in connection with 608, 610, and 710. The communication manager 1032 includes a PDSCH/PUSCH configuring component 1044 that is configured to interpret at least one parameter associated with the at least one PDCCH repetition, a scheduled PDSCH, or a scheduled PUSCH based on the first repetition option, e.g., as described in connection with 622. The communication manager 1032 includes a DL/UL communication component 1046 that is configured to receive at least one PDCCH repetition based on the first repetition option associated with the L1 report or the CSI feedback, and communicate, with the base station, the PDSCH or the PUSCH scheduled by the at least one PDCCH repetition, e.g., as described in connection with 640, 650, and 740.

The apparatus may include additional components that perform each of the blocks of the algorithm in the flowcharts of FIGS. 5, 6, and 7. As such, each block in the flowcharts of FIGS. 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for transmitting at least one of an L1 report or a CSI feedback to a base station, and means for receiving at least one PDCCH repetition based on a first repetition option associated with the L1 report or the CSI feedback. The apparatus 1002 includes means for receiving a search space configuration, the search space configuration including a plurality of repetition options including the first repetition option associated with the L1 report or the CSI feedback or being associated with a threshold value or a range of the L1 report or the CSI feedback, means for activating a set of repetition options based on the at least one L1 report of a current beam, the set of repetition options including the first repetition option, and means for interpreting at least one parameter associated with the at least one PDCCH repetition, a scheduled PDSCH, or a scheduled PUSCH based on the first repetition option. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
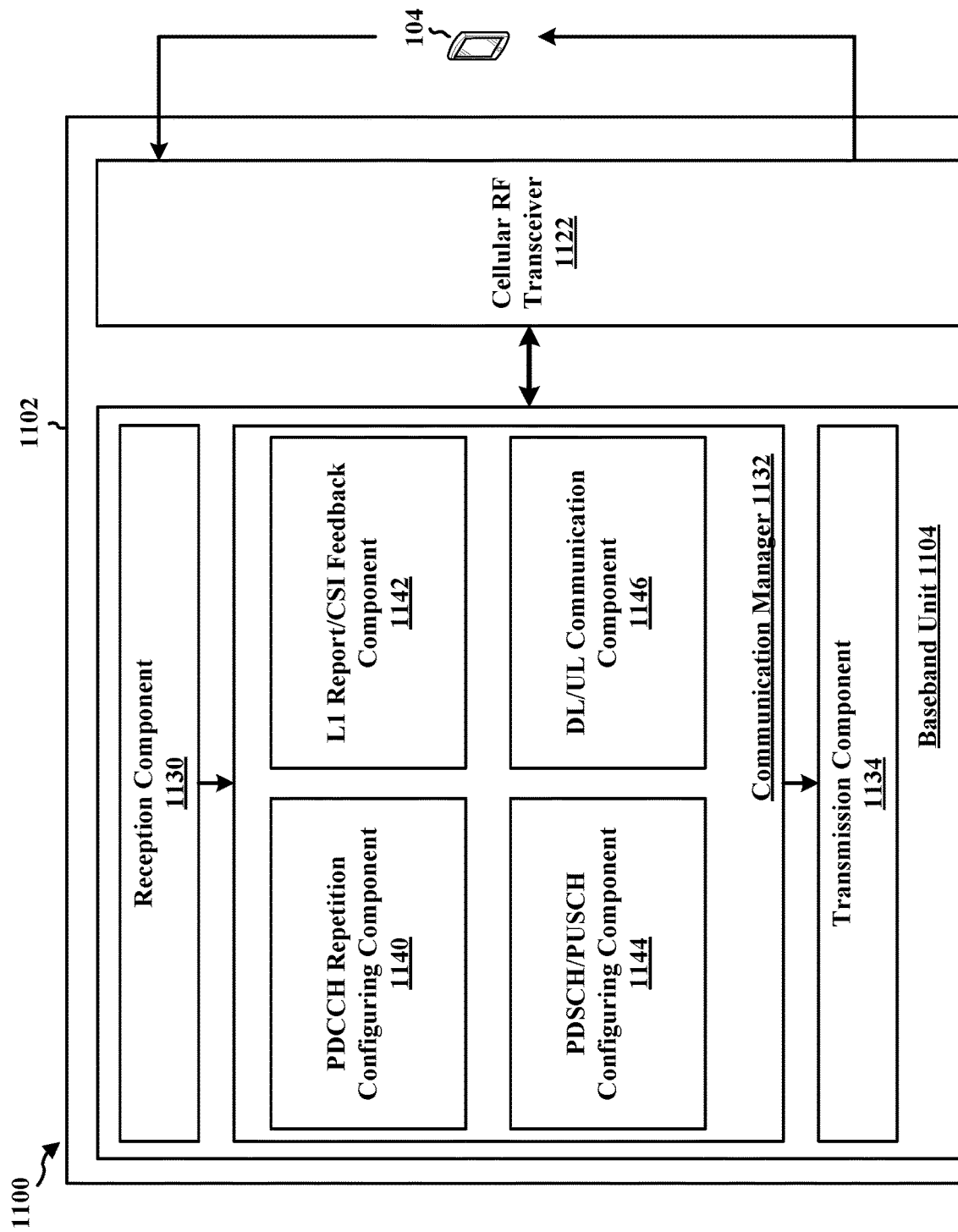
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1002 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a PDCCH repetition configuring component 1140 that is configured to transmit a configuration of the PDCCH repetition to the UE, and activate a set of repetition options based on the at least one L1 report of a current beam, e.g., as described in connection with 806 and 830. The communication manager 1132 further includes an L1 report/CSI feedback component 1142 that is configured to receive at least one of an L1 report or CSI feedback from the UE, e.g., as described in connection with 810 and 910. The communication manager 1132 includes a PDSCH/PUSCH configuring component 1144 that is configured to interpret at least one parameter associated with the at least one PDCCH repetition, a scheduled PDSCH, or a scheduled PUSCH based on the first repetition option, e.g., as described in connection with 832. The communication manager 1132 includes a DL/UL communication component 1146 that is configured to transmit at least one PDCCH repetition based on the first repetition option associated with the L1 report or the CSI feedback received from the UE, and communicate, with the UE, the PDSCH or the PUSCH scheduled by the at least one PDCCH repetition, e.g., as described in connection with 840, 850, and 940.

The apparatus may include additional components that perform each of the blocks of the algorithm in the flowcharts of FIGS. 5, 8, and 9. As such, each block in the flowcharts of FIGS. 5, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for receiving at least one of an L1 report or CSI feedback from a UE, and means for transmitting at least one PDCCH repetition based on a first repetition option associated with the L1 report or the CSI feedback received from the UE. The apparatus 1102 includes means for transmitting a search space configuration, the search space configuration including a plurality of repetition options including the first repetition option associated with the L1 report or the CSI feedback or being associated with a threshold value or a range of the L1 report or the CSI feedback, means for activating a set of repetition options based on the at least one L1 report of a current beam, the set of repetition options including the first repetition option. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

The UE may transmit, to the base station, at least one of an L1 report or a CSI feedback of the current beam. The base station may receive the at least one of the L1 report or the CSI feedback of the current beam from the UE, and transmit at least one PDCCH repetition based on a first repetition option associated with the L1 report received from the UE. The UE may receive, from the base station, the PDCCH repetition based on the first repetition option associated with the L1 report received from the UE. The base station and the UE may communicate PDSCH or PUSCH scheduled by the at least one PDCCH repetition based on the first repetition option associated with the L1 report or the CSI feedback.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, including at least one processor coupled to a memory and configured to transmit at least one of an L1 report or a CSI feedback to a base station, and receive at least one PDCCH repetition based on a first repetition option associated with the L1 report or the CSI feedback.

Aspect 2 is the apparatus of aspect 1, where the at least one processor and the memory are further configured to receive a search space configuration, the search space configuration including a plurality of repetition options including the first repetition option associated with the L1 report or the CSI feedback.

Aspect 3 is the apparatus of any of aspects 1 and 2, where the first repetition option indicates a set of multiple beams for the PDCCH repetition, and the set of multiple beams being based at least partially on the at least one L1 report.

Aspect 4 is the apparatus of any of aspects 1 to 3, where the first repetition option indicates that the at least one PDCCH repetition is received over a set of paired search spaces, the set of paired search spaces may be determined at least on partially based on the at least one L1 report.

Aspect 5 is the apparatus of aspect 1 to 4, where the at least one PDCCH repetition is received over at least one beam for a set of CORESETs associated with the set of paired search space.

Aspect 6 is the apparatus of any of aspects 1 to 5, where the at least one processor and the memory are further configured to activate a set of repetition options based on the at least one L1 report of a current beam, the set of repetition options including the first repetition option.

Aspect 7 is the apparatus of aspect 6, where the at least one processor and the memory are further configured to receive a search space configuration, the search space configuration being associated with a threshold value or a range of the L1 report or the CSI feedback, where the set of repetition options is activated based on the at least one L1 report or the CSI feedback of the current beam being within the range or meeting the threshold value.

Aspect 8 is the apparatus of any of aspects 6 and 7, where the set of repetition options is activated after a processing time following transmission of the at least one L1 report.

Aspect 9 is the apparatus of any of aspects 1 to 8, where the L1 report includes at least one of CQI, an L1-RSRP, an L1-SINR, or a CSI feedback.

Aspect 10 is the apparatus of any of aspects 1 to 9, where the at least one processor and the memory are further configured to interpret at least one parameter associated with the at least one PDCCH repetition, a scheduled PDSCH, or a scheduled PUSCH based on the first repetition option, where the at least one parameter including at least one of a first offset between the at least one PDCCH repetition and the scheduled PDSCH (K0), a second offset between the scheduled PDSCH and an ACK/NACK feedback for the scheduled PDSCH (K1), and a third offset between the at least one PDCCH repetition and the scheduled PUSCH (K2).

Aspect 11 is the apparatus of aspect 10, where at least one of the K0, the K1, or the K2 are interpreted based on a last PDCCH repetition of the at least one PDCCH repetition.

Aspect 12 is the apparatus of aspect 10, where at least one of the K0, the K1, or the K2 are interpreted based on a first PDCCH repetition of the at least one PDCCH repetition.

Aspect 13 is the apparatus of any of aspects 10 to 12, where at least one of the K0, the K1, or the K2 are interpreted based on a number of the at least one PDCCH repetition.

Aspect 14 is the apparatus of any of aspects 10 to 13, where at least one of the K0, the K1, or the K2 are interpreted based on whether the at least one PDCCH repetition is received over a set of multiple beams or a set of paired search spaces.

Aspect 15 is the apparatus of any of aspects 10 to 14, where at least one of the K0, the K1, or the K2 are interpreted based on whether the at least one PDCCH repetition includes intra-slot repetition.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

Aspect 19 is an apparatus for wireless communication at a base station, including at least one processor coupled to a memory and configured to receive at least one of an L1 report or CSI feedback from a UE, and transmit at least one PDCCH repetition based on a first repetition option associated with the L1 report or the CSI feedback received from the UE.

Aspect 20 is the apparatus of aspect 19, where the at least one processor and the memory are further configured to transmit a search space configuration, the search space configuration including a plurality of repetition options including the first repetition option associated with the L1 report or the CSI feedback.

Aspect 21 is the apparatus of any of aspects 19 and 20, where the first repetition option indicates a set of multiple beams for the PDCCH repetition, and the set of multiple beams being based at least partially on the at least one L1 report.

Aspect 22 is the apparatus of any of aspects 19 to 21, where the first repetition option indicates that the at least one PDCCH repetition is transmitted over a set of paired search spaces, the set of paired search spaces may be determined at least on partially based on the at least one L1 report.

Aspect 23 is the apparatus of aspect 22, where the at least one PDCCH repetition is transmitted over at least one beam for a set of CORESETs associated with the set of paired search spaces.

Aspect 24 is the apparatus of any of aspects 19 to 23, where the at least one processor and the memory are further configured to activate a set of repetition options based on the at least one L1 report of a current beam, the set of repetition options including the first repetition option.

Aspect 25 is the apparatus of aspect 24, where the at least one processor and the memory are further configured to transmit a search space configuration, the search space configuration being associated with a threshold value or a range of the L1 report or the CSI feedback, where the set of repetition options is activated based on the at least one L1 report or the CSI feedback of the current beam being within the range or meeting the threshold value.

Aspect 26 is the apparatus of any of aspects 24 and 25, where the set of repetition options is activated after a processing time following reception of the at least one L1 report.

Aspect 27 is the apparatus of any of aspects 19 to 26, where the L1 report includes at least one of CQI, an L1-RSRP, an L1-SINR, or a CSI feedback.

Aspect 28 is the apparatus of any of aspects 19 to 27, where the at least one processor and the memory are further configured to interpret at least one of a first offset between the at least one PDCCH repetition and a scheduled PDSCH (K0), a second offset between the scheduled PDSCH and an ACK/NACK feedback for the scheduled PDSCH (K1), and a third offset between the at least one PDCCH repetition and a scheduled PUSCH (K2) based on the first repetition option.

Aspect 29 is the apparatus of aspect 28, where at least one of the K0, the K1, or the K2 are interpreted based on a last PDCCH repetition of the at least one PDCCH repetition.

Aspect 30 is the apparatus of aspect 28, where at least one of the K0, the K1, or the K2 are interpreted based on a first PDCCH repetition of the at least one PDCCH repetition.

Aspect 31 is the apparatus of any of aspects 28 to 30, where at least one of the K0, the K1, or the K2 are interpreted based on a number of repetitions of the at least one PDCCH repetition.

Aspect 32 is the apparatus of any of aspects 28 to 31, where at least one of the K0, the K1, or the K2 are interpreted based on whether the at least one PDCCH repetition is transmitted over a set of multiple beams or a set of paired search spaces.

Aspect 33 is the apparatus of any of aspects 28 to 32, where at least one of the K0, the K1, or the K2 are interpreted based on whether the at least one PDCCH repetition includes intra-slot repetition.

Aspect 34 is a method of wireless communication for implementing any of aspects 19 to 33.

Aspect 35 is an apparatus for wireless communication including means for implementing any of aspects 19 to 33.

Aspect 36 is a computer-readable medium storing computer executable code, where the code when executed by a processor causes the processor to implement any of aspects 19 to 33.

What is claimed is:

1. An apparatus for wireless communication at a user equipment (UE), comprising:
    memory; and
    at least one processor coupled to the memory and configured to:
        receive, from a base station, a configuration including a plurality of repetition options for the UE, wherein the plurality of repetition options includes a first repetition option, and wherein the configuration further includes an indication of a threshold value or a range of at least one of a physical layer (L1) report or a channel state information (CSI) feedback for the UE to activate the first repetition option from the plurality of repetitions options;
        transmit the at least one of the L1 report or the CSI feedback to the base station after reception of the configuration of the plurality of repetition options;
        activate, by the UE, the first repetition option from the plurality of repetition options in the configuration based on the L1 report or the CSI feedback meeting the threshold value or being within the range indicated in the configuration; and
        receive at least one physical downlink control channel (PDCCH) repetition based on the first repetition option, from the configuration received prior to the L1 report or the CSI feedback, based on the at least one of the L1 report or the CSI feedback meeting the threshold value or being within the range.

2. The apparatus of claim 1, further comprising a transceiver coupled to the at least one processor, wherein the configuration is a search space configuration, the search space configuration including the plurality of repetition options including the first repetition option associated with the at least one of the L1 report or the CSI feedback.

3. The apparatus of claim 1, wherein the first repetition option indicates a set of multiple beams for PDCCH repetition, and the set of multiple beams being based at least partially on the at least one of the L1 report or the CSI feedback.

4. The apparatus of claim 1, wherein the first repetition option indicates that the at least one PDCCH repetition is received over a set of paired search spaces, the set of paired search spaces may be determined at least on partially based on the at least one of the L1 report or the CSI feedback.

5. The apparatus of claim 4, wherein the at least one processor is configured to receive the at least one PDCCH repetition over at least one beam for a set of control resource sets (CORESETs) associated with the set of paired search spaces.

6. The apparatus of claim 1, wherein the at least one processor is further configured to: activate a set of repetition options based on the at least one of the L1 report or the CSI feedback of a current beam, the set of repetition options including the first repetition option.

7. The apparatus of claim 6, wherein the configuration is a search space configuration, the search space configuration being associated with the threshold value or the range of the at least one of the L1 report or the CSI feedback, wherein the set of repetition options is activated based on the at least one of the L1 report or the CSI feedback of the current beam being within the range or meeting the threshold value.

8. The apparatus of claim 6, wherein the at least one processor is configured to activate the set of repetition options after a processing time following transmission of the at least one of the L1 report or the CSI feedback.

9. The apparatus of claim 1, wherein the L1 report includes at least one of channel quality indicator (CQI), an L1 reference signal received power (RSRP) (L1-RSRP), an L1 signal-to-interference-plus-noise (SINR) (L1-SINR), or the CSI feedback.

10. The apparatus of claim 1, wherein the at least one processor is further configured to: interpret at least one of a first offset between the at least one PDCCH repetition and a scheduled PDSCH (K0), a second offset between the scheduled PDSCH and an acknowledgment (ACK)/negative ACK (NACK) feedback for the scheduled PDSCH (K1), and a third offset between the at least one PDCCH repetition and a scheduled PUSCH (K2) based on the first repetition option.

11. The apparatus of claim 10, wherein at least one of the K0, the K1, or the K2 are interpreted based on at least one of a first PDCCH repetition of the at least one PDCCH repetition or a last PDCCH repetition of the at least one PDCCH repetition.

12. The apparatus of claim 10, wherein at least one of the K0, the K1, or the K2 are interpreted based on a number of the at least one PDCCH repetition.

13. The apparatus of claim 10, wherein at least one of the K0, the K1, or the K2 are interpreted based on whether the at least one PDCCH repetition is received over a set of multiple beams or a set of paired search spaces.

14. The apparatus of claim 10, wherein at least one of the K0, the K1, or the K2 are interpreted based on whether the at least one PDCCH repetition includes intra-slot repetition.

15. An apparatus for wireless communication at a base station, comprising:
memory; and
at least one processor coupled to the memory and configured to:
transmit, to a user equipment (UE), a configuration including a plurality of repetition options for the UE, wherein the plurality of repetition options includes a first repetition option, and wherein the configuration further includes an indication of a threshold value or a range of at least one of a physical layer (L1) report or a channel state information (CSI) feedback for the UE to activate the first repetition option from the plurality of repetitions options;
receive the at least one of the L1 report or the CSI feedback from the UE after transmission of the configuration including the first repetition option; and
transmit at least one physical downlink control channel (PDCCH) repetition based on the first repetition option, from the configuration prior to the L1 report or the CSI feedback, based on the at least one of the L1 report or the CSI feedback received from the UE meeting the threshold value or being within the range indicated in the configuration.

16. The apparatus of claim 15, further comprising a transceiver coupled to the at least one processor, wherein the configuration is a search space configuration, the search space configuration including the plurality of repetition options including the first repetition option associated with the at least one of the L1 report or the CSI feedback.

17. The apparatus of claim 15, wherein the first repetition option indicates a set of multiple beams for the PDCCH repetition, and the set of multiple beams being based at least partially on the at least one of the L1 report or the CSI feedback.

18. The apparatus of claim 15, wherein the first repetition option indicates that the at least one PDCCH repetition is transmitted over a set of paired search spaces, the set of paired search spaces may be determined at least on partially based on the at least one of the L1 report or the CSI feedback.

19. The apparatus of claim 18, wherein the at least one processor is configured to transmit at least one PDCCH repetition over at least one beam for a set of control resource sets (CORESETs) associated with the set of paired search spaces.

20. The apparatus of claim 15, wherein the at least one processor is further configured to: activate a set of repetition options based on the at least one of the L1 report or the CSI feedback of a current beam, the set of repetition options including the first repetition option.

21. The apparatus of claim 20, wherein the configuration is a search space configuration, the search space configuration being associated with the threshold value or the range of the at least one of the L1 report or the CSI feedback, wherein the set of repetition options is activated based on the at least one of the L1 report or the CSI feedback of the current beam being within the range or meeting the threshold value.

22. The apparatus of claim 20, wherein the at least one processor is configured to activate the set of repetition options after a processing time following reception of the at least one of the L1 report or the CSI feedback.

23. The apparatus of claim 15, wherein the L1 report includes at least one of channel quality indicator (CQI), an L1 reference signal received power (RSRP) (L1-RSRP), an L1 signal-to-interference-plus-noise (SINR) (L1-SINR), or the CSI feedback.

24. The apparatus of claim 15, wherein the at least one processor is further configured to: interpret at least one of a first offset between the at least one PDCCH repetition and a scheduled PDSCH (K0), a second offset between the scheduled PDSCH and an acknowledgment (ACK)/negative ACK (NACK) feedback for the scheduled PDSCH (K1), and a third offset between the at least one PDCCH repetition and a scheduled PUSCH (K2) based on the first repetition option.

25. The apparatus of claim 24, wherein at least one of the K0, the K1, or the K2 are interpreted based on at least one of a first PDCCH repetition of the at least one PDCCH repetition or a last PDCCH repetition of the at least one PDCCH repetition.

26. The apparatus of claim 24, wherein at least one of the K0, the K1, or the K2 are interpreted based on a number of repetitions of the at least one PDCCH repetition.

27. The apparatus of claim 24, wherein at least one of the K0, the K1, or the K2 are interpreted based on whether the at least one PDCCH repetition is transmitted over a set of multiple beams or a set of paired search spaces.

28. The apparatus of claim 24, wherein at least one of the K0, the K1, or the K2 are interpreted based on whether the at least one PDCCH repetition includes intra-slot repetition.

29. A method of wireless communication at a user equipment (UE), comprising:
- receiving, from a base station, a configuration including a plurality of repetition options for the UE, wherein the plurality of repetition options includes a first repetition option, and wherein the configuration further includes an indication of a threshold value or a range of at least one of a physical layer (L1) report or a channel state information (CSI) feedback for the UE to activate the first repetition option from the plurality of repetitions options;
- transmitting the at least one of the L1 report or the CSI feedback to the base station after reception of the configuration of the plurality of repetition options;
- activating, by the UE, the first repetition option from the plurality of repetition options in the configuration based on the L1 report or the CSI feedback meeting the threshold value or being within the range indicated in the configuration; and
- receiving at least one physical downlink control channel (PDCCH) repetition based on the first repetition option, from the configuration received prior to the L1 report or the CSI feedback, based on the at least one of the L1 report or the CSI feedback meeting the threshold value or being within the range.

30. A method of wireless communication at a base station, comprising:
- transmitting, to a user equipment (UE), a configuration including a plurality of repetition options for the UE, wherein the plurality of repetition options includes a first repetition option, and wherein the configuration further includes an indication of a threshold value or a range of at least one of a physical layer (L1) report or a channel state information (CSI) feedback for the UE to activate the first repetition option from the plurality of repetitions options;
- receiving the at least one of the L1 report or the CSI feedback from the UE after transmission of the configuration including the first repetition option; and
- transmitting at least one physical downlink control channel (PDCCH) repetition based on the first repetition option, from the configuration prior to the L1 report or the CSI feedback, based on the at least one of the L1 report or the CSI feedback received from the UE meeting the threshold value or being within the range indicated in the configuration.

* * * * *